United States Patent [19]

Kawanishi et al.

[11] 4,425,569

[45] Jan. 10, 1984

[54] NON-IMPACT RECORDING METHOD AND APPARATUS

[75] Inventors: Toshiyuki Kawanishi; Yukio Tabata, both of Numazu, Japan

[73] Assignee: Ricoh Company, Ltd., Tokyo, Japan

[21] Appl. No.: 379,308

[22] Filed: May 18, 1982

[30] Foreign Application Priority Data

May 19, 1981 [JP] Japan ............................... 56-75988

[51] Int. Cl.[3] ........................................ G01D 15/10

[52] U.S. Cl. .............................. 346/76 PH; 346/1.1; 400/120

[58] Field of Search .......................... 346/1.1, 76 PH; 400/120

[56] References Cited

U.S. PATENT DOCUMENTS

| | | | |
|---|---|---|---|
| 2,713,822 | 7/1955 | Newman | 346/1.1 X |
| 3,719,261 | 3/1973 | Heinzer et al | 346/140 R X |
| 3,744,611 | 7/1973 | Montanari et al. | 346/76 PH X |
| 4,309,117 | 1/1982 | Chang et al. | 346/76 PH X |
| 4,345,845 | 8/1982 | Bohnhoff et al. | 346/76 PH X |
| 4,375,339 | 3/1983 | Dyer et al. | 400/120 X |

*Primary Examiner*—Joseph W. Hartary
*Assistant Examiner*—Derek Jennings
*Attorney, Agent, or Firm*—Guy W. Shoup

[57] ABSTRACT

A non-impact recording method and apparatus capable of printing with electroconductive thermal-transferable ink on a receiving surface, with uniform image density and high resolution, and with minimum energy consumption, by embodying the steps of superimposing on a receiving surface of a recording sheet an ink ribbon comprising an electroconductive thermal-transferable ink material; placing a recording electrode having a plurality of recording styli in contact with the ink ribbon, and a return electrode in contact with the ink ribbon, the return electrode disposed at a predetermined distance from the recording electrode, substantially parallel to the recording electrode, with the contact areas with the ink ribbon of the recording electrode being smaller than the contact area with the ink ribbon of the return electrode, which predetermined distance is in the range of $2\times d \leqq Lm \leqq 200\times d$, where d represents the diameter of each stylus of the recording electrode, and Lm represents the minimum distance between each recording stylus and the return electrode, with the total contact area with ink ribbon of the styli being one-fifth or less of the contact area with the ink ribbon of the return electrode; applying between selected recording styli and the return electrode image-delineating electric current so as to generate Joule's heat in the portions in the ink ribbon immediately below the recording electrode; and transferring the electroconductive thermal-transferable ink material from the ink ribbon to the receiving surface of the recording sheet.

8 Claims, 3 Drawing Figures

NON-IMPACT RECORDING METHOD AND APPARATUS

BACKGROUND OF THE INVENTION

The present invention generally relates to a non-impact recording method and apparatus, and more particularly to an electrothermic recording method and apparatus, wherein an electroconductive thermal-transferable ink material is applied to a receiving surface in areas where the ink material is softened in an image pattern by heat generated within the ink material.

Conventionally, several electrothermic printing methods and apparatuses are known in which a ribbon containing or coated with a pigmented and thermal-transferable material is superimposed on plain paper, and the thermal-transferable material is locally softened in image form in response to image-delineating electric currents applied thereto, and is then transferred to the plain paper as dots or lines.

More specifically, U.S. Pat. No. 2,713,822 discloses a recording method of the above-mentioned type which employs a transfer sheet comprising a base sheet of electroconductive material having on one surface a coating of a relatively electrically non-coductive image-forming fusible material, and having on the opposite surface a resistive layer which has substantial electrical resistance as compared with the base sheet. In that method, a voltage is applied between a point on the resistive layer and an edge of the base paper, by means of an electrode, which voltage causes a current to flow between the point and the base paper edge through the connecting portion of the base sheet, the length of which portion varies in accordance with the location of the point. The Joule's heat generated in the portion of the resistive layer immediately below the electrode causes the image-forming fusible material to melt and the melted material is transferred to the underlying planographic printing plate. This method has the disadvantage that the resistance between the point where the electrode is in contact with the resistive layer and the base sheet edge changes as the position of the electrode changes, and accordingly the amount of the Joule's heat generated changes, depending upon the position of the electrode. The result is that inconsistent printing quality is caused since in some portions excess transfer of the image-forming fusible material takes place, while in other portions, the transfer is insufficient, due to variations in the extent of ink melting.

As an improvement on the above method, U.S. Pat. No. 3,744,611, discloses an electrothermic printing device including a printing head having at least two electrodes of different electrical potentials, which are spaced a predetermined distance from each other and are in contact with a ribbon whose thermal-transferable ink layer can be printed on a receiving surface in areas where the ink is softened by the Joule's heat generated by the current flowing through the electrodes. Specifically, in this reference, two types of printing heads are disclosed for use in this printing device. The first printing head comprises a first electrode means comprising an electrode member which has an elongated opening, energizable to a first electrical potential, and serves as a return electrode, and a second electrode means comprising a plurality of wire probes each selectively energizable to a second electrical potential, which probes serve as the recording electrodes and are positioned in the aforementioned elongated opening spaced apart from one another. The second printing head comprises a row of selectively energizable points which serve as the recording electrodes, and two elongated electrodes which serve as the return electrodes and are disposed parallel to the row and positioned on the opposite sides of the row. In these printing heads, the recording electrodes are essentially surrounded with a single return electrode or a pair of return electrodes by either projecting the recording electrodes through an opening in the single, massive return electrode, or by fixing two parallel, elongated return electrodes around a row of recording electrodes, one on each side.

In the above U.S. patent, however, there is no mention of various factors having an effect on apparatus design, printing quality and energy consumption, including the relationship between the Joule's heat generated at the recording electrodes and that at the return electrode, the effect of distance between the recording electrodes and the return electrode, and the relationship between the contact areas with the ink layer of the recording electrodes and the contact area with the ink layer of the return electrode.

In U.S. Pat. No. 3,719,261, there is disclosed a printing method using electroconductive fusible ink. In this method, an electrically anisotropic ink support material—i.e., one in which electric conductivity varies with the direction through the material—is used. In this case, the electric conductivity is greater in the transverse direction (normal to the surface) than in the superficial direction (parallel with the surface). One surface thereof is covered with a solid and fusible electroconductive ink. Pairs of points defining the desired outline are selected on the support. One point of each selected pair is connected to one pole of a current source and the other point of each selected pair is connected to the opposite pole of the source, thus causing current to flow between the points of each selected pair. The ink melts along the current path and the molten ink is picked up by the paper, previously placed in contact with the support, thereby printing the outline defined by the selected pair of points.

In this method, since the melting of the ink is not limited to a point, but takes place along the entire current path, causing the entire molten-ink line to be transferred to the paper, there is a limitation on increasing the obtainable image resolution.

SUMMARY OF THE INVENTION

It is therefore an object of the present invention to provide a non-impact recording method and apparatus capable of delivering maximum image quality with uniform image density and high resolution, with minimum energy consumption.

This object is attained by non-impact recording according to the present invention, comprising an apparatus and method embodying the steps of superimposing on a receiving surface of a recording sheet an ink ribbon comprising an electroconductive thermal-transferable ink material; placing a recording electrode means comprising a plurality of recording styli in contact with the ink ribbon, and a return electrode in contact with the ink ribbon, the return electrode disposed at a predetermined distance from the recording electrode means, substantially parallel to the recording electrode means, with the contact areas with the ink ribbon of the recording electrode means being smaller than the contact area with the ink ribbon of the return electrode, which predetermined distance is in the range of $2\times d \leqq Lm \leqq 200\times d$, where d represents the diameter of each stylus of the recording electrode means, and Lm represents the minimum distance between each recording stylus and the return electrode, with the total contact area with ink ribbon of the styli being one-fifth or less of the contact area with the ink ribbon of the return electrode; applying between selected recording styli and the return electrode image-delineating electric current so as to generate Joule's heat in the portions in the ink ribbon immediately below the recording styli; and transferring the electroconductive thermal-transferable ink material from the ink ribbon to the receiving surface of the recording sheet.

DETAILED DESCRIPTION OF THE PREFERRED EMBODIMENT

Referring to the accompanying drawings, an embodiment of a non-impact printing method and apparatus according to the present invention will now be explained.

Figure 1:
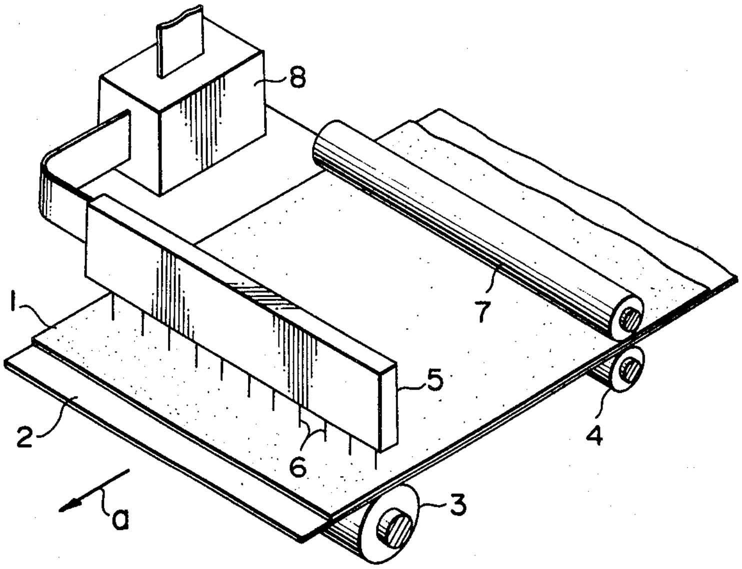
FIG. 1 is a partially cut-away perspective view of a recording apparatus to which a non-impact recording method according to the present invention is applied.

In FIG. 1, reference numeral 1 represents an ink ribbon having an electroconductive thermal-transferable ink layer which can be transferred to a receiving surface by the Joule's heat which is generated in the ink ribbon under application of an electric current thereto. Below the ink ribbon 1, there is placed a recording sheet 2 in contact with the ink ribbon 1. The ink ribbon 1 and the recording sheet 2 are transported, while supported by support rollers 3 and 4, in the direction of the arrow a.

Above the ink ribbon 1, there is situated an electrically insulating support member 5 for supporting a recording electrode which comprises a plurality of recording styli 6 arranged in a row with predetermined spaces therebetween, so that the electrically insulating support member 5 and the recording styli 6 constitute a recording electrode means. The lower portion of each recording stylus 6 is in contact with the surface of the ink ribbon 1. Further, there is disposed a return electrode 7, substantially parallel to the row of recording styli 6. The return electrode 7 is also in contact with the surface of the ink ribbon 1 with a contact area with the ink ribbon 1 at least five times greater than the total contact areas with the ink ribbon 1 of the recording styli 6.

An image-delineating signal application apparatus 8 is connected to the recording styli 6 and the return electrode 7.

When image-delineating signals are applied between the one or more selected recording styli 6 and the return electrode 7, the corresponding image-delineating current flows through the ink ribbon 1. Since the contact area with the ink ribbon 1 of the return electrode 7 is significantly greater (at least five times greater) than the total contact area with the ink ribbon 1 of the recording styli 6, and, of course, greater than the contact area with the ink ribbon 1 of each recording stylus 6, and since the same amount of electric current flows through the recording styli 6 as through the return electrode 7, the current density in the portion of the ink ribbon 1 immediately below each recording stylus 6 is extremely greater than the current density in the portion of the ink ribbon 1 immediately below the return electrode 7. Therefore, in comparison with the Joule's heat generated below the return electrode 7, an extremely great amount of the Joule's heat is generated below the recording styli 6. As a result, by selection of electroconductive thermal-transferable ink with an appropriate melting point, and by supplying an appropriate amount of electric current, only the electroconductive thermal-transferable ink material present immediately below the recording styli 6 is melted by the Joule's heat and is then transferred to the recording sheet 2.

Figure 2:
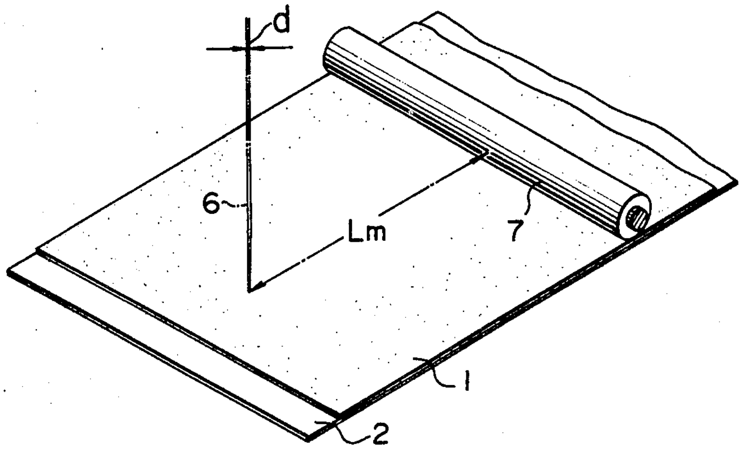
FIG. 2 is a partially enlarged view of the recording apparatus shown in FIG. 1.

As shown in FIG. 2, the recording styli 6 and the return electrode 7 are arranged in accordance with the following relationship:

$$2\times d \leqq Lm \leqq 200\times d$$

where d represents the diameter of each recording stylus 6, and Lm represents the minimum distance between each recording stylus 6 and the return electrode 7, with the total contact area with ink ribbon 1 of the styli 6 being one-fifth or less of the contact area with the ink ribbon of the return electrode 7.

When $Lm=2\times d$, the thermal-transferable material present along the distance between the recording styli 6 and the return electrode 7 is melted and transferred, so that the image resolution is significantly reduced.

On the other hand, when $Lm>200\times d$, the electric energy consumed in the electric path between the recording styli 6 and the return electrode 7 increases to a degree that cannot be ignored, in comparison with the energy consumed in the recording styli 6, resulting in generation of insufficient Joule's heat in the ink ribbon below the styli 6 for practical use or adequate speed. For example, with respect to one recording stylus 6, the total energy consumed when the diameter of the recording stylus 6 is 100 μm and Lm is 1 mm ($Lm=10\times d$) is approximately 3 times the total energy consumed when the diameter of the recording stylus 6 is 100 μm and Lm is 20 mm ($Lm=200\times d$). This difference amounts to a significant value when recording is done by use of a plurality of the recording styli 6 simultaneously. For instance, when the required total electric energy is increased by a factor of three, while the available total energy is constant, the number of dots that can be simultaneously recorded by the recording styli 6 has to be reduced to $\frac{1}{3}$ in number and, accordingly, the recording speed is reduced to $\frac{1}{3}$.

For the above-described reason, for practical use, the relationship between the diameter d of the recording styli 6, and the distance Lm between the recording styli 6 and the return electrode 7 should be as follows:

$$2\times d \leqq Lm \leqq 200\times d, \text{ preferably } 5\times d \leqq Lm \leqq 80\times d.$$

Figure 3:
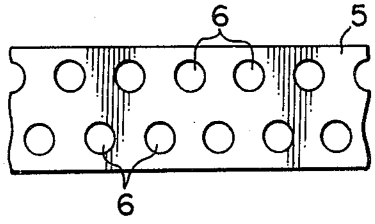
FIG. 3 is a partial bottom view of an example of a recording electrode means, particularly showing the arrangement of its recording styli.

The recording styli 6 can be arranged zig-zag in two rows as shown in FIG. 3. They can also be arranged zig-zag in more than two rows, so as to cover the spaces therebetween as much as possible.

A further modification of the recording styli 6 is that the recording styli 6 can be divided into m blocks, each of which blocks consists of n styli 6, and image-delineating signals can be successively applied to all the recording styli 6 of each block. Alternatively, depending upon the image, the image-delineating signals can be simultaneously applied to all the recording styli 6 of each block.

Referring back to FIG. 1, in the non-impact recording apparatus according to the present invention, the recording electrode means, comprising the recording styli 6 arranged in a row with predetermined spaces therebetween and supported by the support member 5, is arranged substantially parallel to the return electrode 7. As shown in the figure, the return electrode 7 is formed in the shape of a roller so as to be rotatable, thus capable of serving as a transport member for transporting the ink ribbon 1 and the recording sheet 2, in combination with the support member 4 disposed under the return electrode 7. Under the recording styli 6, there is also disposed the support member 3, in such a manner as to hold and transport the superimposed ink ribbon 1 and recording sheet 2 therebetween. Alternatively, the return electrode 7 can be formed so as to have a flat surface which can be put into close with the ink ribbon 1, with a transport member being disposed separately from the return electrode 7. Further, the recording electrode means and the return electrode 7 can be formed in one piece by connecting them to each other by an electrically insulating frame member.

The non-inpact recording method and apparatus according to the present invention can be applied to any kind of ink ribbon containing a thermal-transferable ink material which is fused and becomes transferable when heated to a predetermined temperature. The following ink ribbon are particularly suitable for use in the non-impact recording method and apparatus according to the present invention:

(1) Single layer type ink ribbon

This ink ribbon itself is electroconductive and thermal-transferable, and comprises a thermofusible resin, such as vinyl chloride acetate copolymer, butadiene-styrene copolymer, acrylic resin, polycarbonate, polyester resin, polyvinyl butyral resin, cellulose acetate resin and terpene polymers, and an electrically conductive material, such as conductive carbon black and metal particles, and, if necessary, pigments, and auxiliary agents, such as plasticizers, dispersants and stabilizers. It is preferable that the thickness of the single layer type ink ribbon be in the range of 5 μm to 50 μm, and the electric resistivity be in the range of $1\times10^{-2}$ Ωcm to $1\times10^{3}$ Ωcm.

(2) Double layer type ink ribbon

This ink ribbon comprises a support material and an ink layer. The support material comprises a resin, such as polycarbonate and polyester, and an butadiene-styrene copolymer, acrylic resin, electrically conductive material. The ink layer comprises a thermo-fusible material, such as vinyl chloride acetate copolymer, butadiene-styrene copolymer, acrylic resin, polycarbonate, polyester resin, polyvinyl butyral resin, cellulose acetate resin, waxes, and styrene-acrylic ester copolymer; and an electrically conductive material, such as conductive carbon black and metal particles, and, if necessary, pigments, and auxiliary agents, such as plasticizers, dispersants and stabilizers. It is preferable that the thickness of the support material be in the range of 0.5 μm to 20 μm and the electric resistivity thereof be in the range of $1\times10^{1}$ Ωcm to $1\times10^{3}$ Ωcm. It is preferable that the thickness of the ink layer be in the range of 1 μm to 25 μm, and the electric resistivity thereof be in the range of $1\times10^{-2}$ Ωcm to $1\times10^{1}$ Ωcm.

(3) An electrically anisotropic ink ribbon

This ink ribbon varies in electric conductivity with the direction. For instance, an ink ribbon as disclosed in Japanese Patent Publication No. 56-10191, in which the conductivity is made greater in the transverse direction (normal to the surface) than in the superficial direction (parallel with the surface) by distributing electrically conductive particles in a chain-like manner in the transverse direction throughout the ink ribbon.

In all of these ink ribbons, since the ink layers are electrically conductive to the extent as described above, and Joule's heat is generated within the ink layer, images with higher resolution can be obtained, in comparison with the ink ribbons in which the ink layer is indirectly heated. This is because the heat acts in a concentrated manner in the ink where it is generated, in contrast with the case where it is generated in a layer above the ink layer and is then conducted to the ink layer, radiating outward from its source and being less concentrated ("focused") by the time it acts on the ink.

The present invention will now be explained more specifically by referring to the following examples.

EXAMPLE 1

The recording styli 6 with a diameter of 130 μm were arranged with a density of 8 styli per mm and with the distance Lm between the recording styli 6 and the return electrode 7 being set 1 mm away, which corresponded to $Lm = 7.8\times d$. Under this condition, the recording styli 6 and the return electrode 7 were placed in contact with an ink ribbon with a thickness of 12 μm, comprising 12% by weight of carbon black and 88% by weight of polycarbonate. The contact area of the return electrode 7 with the ink ribbon was 10 $mm^2$. The resistivity of the ink ribbon was 2 Ωcm. Under the ink ribbon was placed a sheet of plain paper in contact therewith, and a pulse voltage of 100 V with a pulse width of 1 msec was applied between the recording styli 6 and the return electrode 7. An electric current of 65 mA flowed through the ink ribbon 1, and clear dots with a diameter of approximately 150 μm and with an image density of 1.1 (measured by a microdensitometer) were formed on the plain paper.

EXAMPLE 2

A mixture of the following components was dispersed for 5 hours in a ball mill made of glass.

| | Parts by Weight |
|---|---|
| Triacetate cellulose (Acetylation Degree: 62%, Melting Point 306° C.) | 9.3 |
| Carbon black | 0.7 |
| Methylene chloride | 100.0 |

The thus obtained dispersion was coated on a glass plate by a doctor blade and was then dried, whereby a base layer with a resistivity of 20 Ω cm and with a thickness of 10 μm was formed.

A mixture of the following components was dispersed for 8 hours in a ball mill made of glass.

| | Parts by Weight |
|---|---|
| Styrene-butadiene copolymer | 8.0 |
| Carbon black | 2.0 |
| Ethyl alcohol | 120.0 |

The thus prepared dispersion was coated on the above-mentioned base layer by a doctor blade and was then dried, whereby an ink layer with a resistivity of 0.5 Ω cm and with a thickness of 5 μm was formed. The base layer and the ink layer were integrally peeled off the glass plate, whereby an ink ribbon for use in the present invention was prepared.

This ink ribbon was placed on a sheet of plain paper in such a manner that its ink layer was in close contact with the plain paper.

The recording styli 6 with a diameter of 130 μm, which were arranged with a density of 8 styli per mm, were placed on the ink material, with the distance Lm between the recording styli 6 and the return electrode 7 being set at 1 mm. The return electrode 7 had a contact area of 10 $mm^2$ with the ink ribbon. Under this condition, a pulse voltage of 50 V with a pulse width of 0.5 msec was applied between the recording styli 6 and the return electrode 7. An electric current of 10 mA flowed through the ink ribbon, and clear circular dots with a diameter of approximately 150 μm and with an image density of 1.3 (measured by a microdensitometer) were formed on the plain paper.

COMPARATIVE EXAMPLE 1

Example 1 was repeated except that the distance between the recording styli 6 and the return electrode 7 was increased to 30 mm ($Lm = 230 \times d$). The result was that an electric current of only 16 mA flowed and no dots were formed on the plain paper.

COMPARATIVE EXAMPLE 2

Example 1 was repeated except that the distance between the recording styli 6 and the return electrode 7 was increased to 30 mm ($Lm = 230 \times d$) and a pulse voltage of 250 V with a pulse width of 2 msec was applied between the recording styli 6 and the return electrode 7. An electric current of 40 mA flowed through the ink ribbon 1, and dots with a diameter in the range of approximately 60 μm to 70 μm and with an image density of 0.7 were faintly formed on the plain paper.

COMPARATIVE EXAMPLE 3

The recording styli 6, the return electrode 7 and the ink ribbon 1 were arranged in the same manner as in Example 1. To one of the recording styli 6 was applied a pulse voltage of 40 volts and a pulse width of 1 msec, and an recording stylus 6 adjacent to the above recording stylus 6 was grounded. An electric current of 70 mA flowed through the ink ribbon 1 and elliptic dots with a major axis of about 400 μm and a minor axis of about 150 μm were formed. As a matter of fact, the thus obtained dots were far from practical use in image formation.

What is claimed is:

1. A non-impact recording method for printing with electroconductive thermal-transferable ink on a receiving surface, comprising the steps of:

superimposing on a receiving surface of a recording sheet an ink ribbon comprising a layer of an electroconductive and thermal-transferable ink material;

placing a recording electrode means comprising a plurality of recording styli in contact with said ink ribbon, and a return electrode in contact with said ink ribbon, said return electrode disposed at a predetermined distance from said recording electrode means, substantially parallel to said recording styli, with the total contact area with said ink ribbon of said recording styli being smaller than the contact area with said ink ribbon of said return electrode, which predetermined distance is in the range of $2 \times d \leqq Lm \leqq 200 \times d$, where d represents the diameter of each recording stylus of said recording electrode means, and Lm represents the minimum distance between each recording stylus and said return electrode; and applying between selected recording styli and said return electrode image-delineating electric current so as to generate Joule's heat in the portions in said ink ribbon immediately below said selected recording styli; and transferring the electroconductive thermal-transferable ink material from said ink ribbon to said receiving surface of said recording sheet.

2. A non-impact recording method as claimed in claim 1, wherein said total contact area of said recording styli with said ink ribbon is one-fifth or less said contact area of said return electrode with said ink ribbon.

3. A non-impact recording method as claimed in claim 1, wherein said ink ribbon comprises a single electroconductive thermal-transferable layer which comprises a thermo-fusible resin and an electroconductive material, the thickness of said single layer being in the range of 5 μm to 50 μm, and the resistivity thereof being $1 \times 10^{-2}$ Ωcm to $1 \times 10^{3}$ Ωcm.

4. A non-impact recording method as claimed in claim 1, wherein said ink ribbon comprises an electroconductive thermal-transferable layer and a support material for supporting said thermal-transferable layer, said thermal-transferable layer comprising a thermo-fusible resin and an electroconductive material, having a thickness ranging from 5 μm to 50 μm and with a resistivity ranging from $1 \times 10^{-2}$ Ωcm to $1 \times 10^{3}$ Ωcm, and said support material having a thickness in the range of 0.5 μm to 20 μm, and an electric resistivity in the range of $1 \times 10^{1}$ Ωcm to $1 \times 10^{3}$ Ωcm.

5. A non-impact recording method as claimed in claim 1, wherein said ink ribbon is an electrically anisotropic ink ribbon comprising an electroconductive thermal-transferable material, the electric conductivity of said ink ribbon being greater in the direction normal to the surface thereof than in the direction parallel with the surface thereof.

6. A non-impact recording apparatus for printing with thermally transferable ink on a receiving surface comprising:

an ink ribbon comprising an ink layer of electroconductive and thermal-transferable material, and a recording sheet disposed below said ink ribbon, to which recording sheet said thermal-transferable ink is transferred when said ink ribbon is heated to a predetermined temperature;

a transport means for transporting said recording sheet;

a recording electrode means comprising a plurality of recording styli spaced a predetermined distance from each other, which recording styli are in contact with said ink ribbon in order to allow current to flow through said electroconductive thermal-transferable ink layer and to generate Joule's heat therein;

a return electrode which is in contact with said ink ribbon, and is disposed a predetermined distance from said recording electrode means, substantially parallel with said recording styli, with the total contact area with said ink ribbon of said recording styli being smaller than the contact area with said ink ribbon of said return electrode, which predetermined distance is in the range of $2\times d \leqq Lm \leqq 200\times d$, where d represents the diameter of each recording stylus of said recording electrode means, and Lm represents the minimum distance between each recording stylus and said return electrode; and an image-delineating signal application apparatus which is connected to said recording electrode means and to said return electrode means and applies a predetermined voltage across said ink ribbon between said recording styli and said return electrode, by applying image-delineating current to said recording styli selectively in accordance with the image to be recorded on said recording sheet.

7. A non-impact recording apparatus as claimed in claim 6, wherein said transport means is disposed on the opposite side of said return electrode with respect to said superimposed ink ribbon and recording sheet, and said return electrode means is a roller which is in rotatable contact with the surface of said ink ribbon and serves to transport said ink ribbon and recording sheet, in association with said transport means.

8. A non-impact recording apparatus for printing with thermally transferable ink on a receiving surface comprising:

a transport means for transporting an ink ribbon comprising a thermal-transferable ink layer, and a recording sheet disposed below said ink ribbon, in a predetermined direction during recording, to which recording sheet said thermal-transferable ink is transferred when said ink ribbon is heated to a predetermined temperature;

a recording electrode means comprising a plurality of recording styli spaced a predetermined distance from each other, which recording styli are in contact with said ink ribbon in order to allow current to flow through said electroconductive thermal-transferable ink layer and to generate Joule's heat therein;

a return electrode which is in contact with said ink ribbon, and is disposed a predetermined distance from said recording electrode means, substantially parallel with said recording styli, with the total contact area with said ink ribbon of said recording styli being smaller than the contact area with said ink ribbon of said return electrode, which predetermined distance is in the range of $2\times d \leqq Lm \leqq 200\times d$, where d represents the diameter of each recording stylus of said recording electrode means, and Lm represents the minimum distance between each recording stylus and said return electrode; and an image-delineating signal application apparatus which is connected to said recording electrode means and to said return electrode means and applies a predetermined voltage across said ink ribbon between said recording styli and said return electrode, by applying image-delineating current to said recording styli selectively in accordance with the image to be recorded on said recording sheet, wherein said recording styli are arranged zig-zag in a plurality of rows, which rows are substantially parallel with said return electrode.

* * * * *